US010205969B2

(12) United States Patent
Jeong

(10) Patent No.: US 10,205,969 B2
(45) Date of Patent: Feb. 12, 2019

(54) 360 DEGREE SPACE IMAGE REPRODUCTION METHOD AND SYSTEM THEREFOR

(71) Applicant: Gwan Ho Jeong, Goyang-si (KR)

(72) Inventor: Gwan Ho Jeong, Goyang-si (KR)

( * ) Notice: Subject to any disclaimer, the term of this patent is extended or adjusted under 35 U.S.C. 154(b) by 0 days.

(21) Appl. No.: 15/505,035

(22) PCT Filed: Jun. 26, 2015

(86) PCT No.: PCT/KR2015/006531
§ 371 (c)(1),
(2) Date: Feb. 17, 2017

(87) PCT Pub. No.: WO2016/027977
PCT Pub. Date: Feb. 25, 2016

(65) Prior Publication Data
US 2017/0272785 A1 Sep. 21, 2017

(30) Foreign Application Priority Data

Aug. 18, 2014 (KR) ........................ 10-2014-0106807

(51) Int. Cl.
H04N 21/218 (2011.01)
H04N 21/2387 (2011.01)
H04N 21/60 (2011.01)
H04L 29/06 (2006.01)
H04N 21/472 (2011.01)
H04N 21/81 (2011.01)
H04N 21/4728 (2011.01)
H04N 21/6587 (2011.01)

(52) U.S. Cl.
CPC ... *H04N 21/21805* (2013.01); *H04L 65/4092* (2013.01); *H04L 65/601* (2013.01); *H04N 21/2387* (2013.01); *H04N 21/4728* (2013.01); *H04N 21/47202* (2013.01); *H04N 21/47205* (2013.01); *H04N 21/60* (2013.01); *H04N 21/6587* (2013.01); *H04N 21/816* (2013.01)

(58) Field of Classification Search
None
See application file for complete search history.

(56) References Cited

U.S. PATENT DOCUMENTS 8,121,460 B2 2/2012 Sasaki et al.
9,201,470 B2 12/2015 Kim et al.
(Continued)

FOREIGN PATENT DOCUMENTS

EP 1463325 A2 9/2004
JP 2009-95032 A 4/2009
(Continued)

*Primary Examiner* — Justin E Shepard
(74) *Attorney, Agent, or Firm* — Maschoff Brennan

(57) ABSTRACT

The present invention relates to a space image reproduction method for loading two or more videos to a terminal to show videos of various angles and a system therefor. In particular, the present invention relates to a space image reproduction method configured to load a video, which is being reproduced, and a video adjacent to the video together, and to enable a user to drag and select a video of a desired angle and view, freely and in real time, a desired part of the selected video through an up and down-right and left movement, zoom in, and zoom out, and a system therefor.

3 Claims, 8 Drawing Sheets

(56) References Cited

U.S. PATENT DOCUMENTS

| | | | |
|---|---|---|---|
| 2007/0296721 A1 | 12/2007 | Chang et al. | |
| 2009/0262206 A1* | 10/2009 | Park | G08B 13/19641 |
| | | | 348/218.1 |
| 2015/0373075 A1* | 12/2015 | Perlman | H04L 65/608 |
| | | | 709/217 |

FOREIGN PATENT DOCUMENTS

| | | |
|---|---|---|
| KR | 10-2006-0041060 A | 5/2006 |
| KR | 10-2011-0103692 A | 9/2011 |
| KR | 10-2012-0115015 A | 10/2012 |
| WO | 2010/146847 A1 | 12/2010 |

* cited by examiner

360 DEGREE SPACE IMAGE REPRODUCTION METHOD AND SYSTEM THEREFOR

TECHNICAL FIELD

The present invention relates to a spatial image reproduction method and system for loading two or more videos on a terminal to display videos of various angles, and more particularly, to a spatial image reproduction method and system in which a video being reproduced and a neighboring video are loaded together, a video of a desired angle is selected by dragging, and a desired portion of the selected video may be freely viewed in real time through upward, downward, leftward, or rightward movement, a zoom-in or zoom-out operation, or the like.

BACKGROUND ART

Conventional video special effect techniques include a time slicing technique, a 360 degree panoramic image technique, and the like.

First, the time slicing technique refers to an imaging technique such that a plurality of cameras is installed around a subject at various angles and a constant interval, the subject is instantaneously photographed simultaneously by the cameras, and then the photographs are connected using a computer, whereby still movement of the subject is viewed as if it is photographed by a movie camera. Although this technique is a method of taking a motion picture using a still camera, the subject stands still. The technique is a certain type of photograph-using animation technique where the still subject is three-dimensionally depicted. When a smoking person is photographed using this technique, a camera motion that circles one revolution around the person may be made without image disconnection while the person and smoke from the person, frozen in the air, stand still.

In other words, one frame of an image can be three-dimensionally depicted in one shot. Thus, the image seems like beyond time and space. Generally, 20 to 50 still cameras are installed circularly or linearly at the same interval from a subject, and the subject is photographed simultaneously by the cameras, and then the photographs are connected to one another, thereby editing images. By doing so, a still motion, like a mannequin of the subject, is displayed on a screen.

Thus, the time-slicing technique, where still images are connected to one another at various angles, has a limitation in reproduction of playing videos at various angles, in particular, a problem in that a user cannot selectively view a desired video in a particular direction.

Meanwhile, the 360 degree panoramic image technique refers to an imaging technique where photographing is performed by a camera at a fixed position through a 360 degree turn, and then a user can view an ambient space of the consecutive images through manipulation of a mouse or a touchscreen, and has been applied to road views of commercially available portal sites, and the like. This technique allows a user to directly manipulate beyond monotonous and one-sided spatial information of an existing image, thereby providing the user with fun and satisfaction. In addition, combined with web technology, the 360 degree panoramic image technique may structure and display multi-spatial information through moving lines. In addition, this technique is an imaging technology that can meet the desires of users who want to directly explore every inch of a target space by stereoscopically providing information about the surrounding space.

However, as in the time-slicing technique, the 360 degree panoramic image technique also has problems in that a playing video cannot be converted and reproduced by a user in real time at a desired angle, in particular, severe image distortion. Korean Patent Application Publication No. 10-2011-0103692, which discloses a panoramic image reproduction method, also describes a limitation on application thereof to videos. That is, when this technique is used, only a still subject spread in the 360 degree surroundings is viewed by a single camera.

DISCLOSURE

Technical Problem

Therefore, the present invention has been made in view of the above problems, and it is one object of the present invention to provide a video reproduction method and system in which a video is played, a user selects and plays a video of a desired angle while watching the playing video, and a desired part of the selected video is moved upward, downward, leftward, or rightward, zoomed in, or zoomed out, thereby viewing an active and more realistic image.

The above and other objects can be accomplished by the present invention described below.

Technical Solution

In accordance with one aspect of the present invention, provided is a method of reproducing a 360 degree spatial image.

First, a waiting step of waiting for a video selection signal from a terminal, wherein the waiting is performed by a server, is performed. The waiting step may include a database (DB) construction step of constructing a layer DB storing two or more videos generated by two or more video photographing members, the DB construction step being performed by the server.

Next, a reproduction step of transmitting, to the terminal, a video selected according to the video selection signal and reproducing the selected video, the transmitting being performed by the server and the reproducing being performed by the terminal is performed. The reproduction step may include transmitting, to the terminal, one or more videos adjacent to the selected video, the transmitting being performed by the server.

Next, an angle change step of converting the video into a video of another angle according to an angle change signal of the terminal is performed.

In addition, the angle change step may include transmitting, to the terminal, one or more videos adjacent to the video of another angle, the transmitting being performed by the server.

In accordance with another aspect of the present invention, provided is a 360 degree spatial image reproduction system.

That is, there is provided a 360 degree spatial image reproduction system including: a terminal in which an application program for reproducing a video and selecting a video of a desired angle is installed; a server to transmit and receive data through the terminal and a wired/wireless network; and a layer DB installed in the server to store a video.

The server may include: a video selection module to search for a corresponding video according to a video selection signal or angle change signal transmitted from the terminal, select the corresponding video and one or more neighboring videos, and transmit the corresponding video and the one or more neighboring videos to the terminal; an application program supply module to supply an application program installed in the terminal to reproduce a video and select a video of a desired angle; and a data transmission module to transmit and receive various data to and from the terminal.

In addition, the server may further include a video collection module to collect videos photographed by a plurality of video photographing members installed around a subject and store the collected videos in the layer DB.

Advantageous Effects

As is apparent from the fore-going description, the present invention advantageously provides a 360 degree spatial image reproduction method and system, in which videos of various angles are provided according to user's requirements and thus problems of an existing time-slicing method or panoramic method, e.g., inability to display videos of various angles, may be addressed.

That is, problems of the time-slicing method in that only a still image may be displayed and interactive manipulation is impossible may be addressed. In addition, problems of the panoramic method, e.g., display of only a still image and severe image distortion, may be addressed.

In addition, the present invention provides an effect of providing videos of various angles in real time in a small data transmission amount.

BEST MODE

Figure 1:
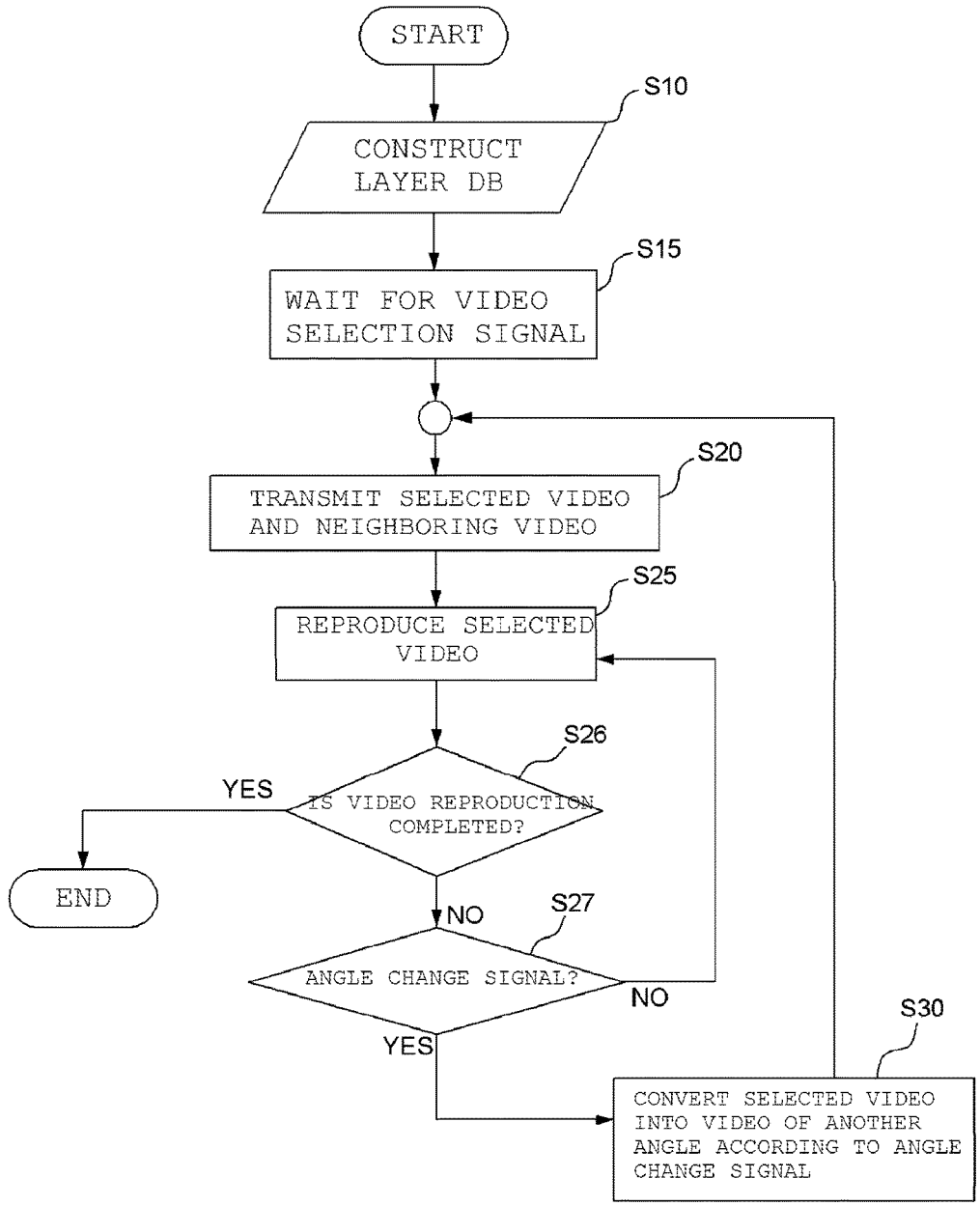
FIG. 1 is a flowchart for displaying a 360 degree spatial image, according to the present invention.

Hereinafter, exemplary embodiments of the present invention will be described in detail with reference to the accompanying drawings. Although like elements are illustrated in different drawings, like reference numerals denote the like elements throughout the drawings. In description of the present invention, a detailed description of relevant configurations or functions well known in the art will not be provided herein so as not to obscure the invention.

Hereinafter, a 360 degree spatial image reproduction method according to the present invention will be described with reference to FIG. 1. FIG. 1 is a flowchart for displaying a 360 degree spatial image according to the present invention.

First, a server 20 waits for a video selection signal from a terminal 10 (operation S15). The waiting step may include a database (DB) construction step of constructing a layer DB 30 that stores two or more videos generated by two or more video photographing members (e.g., CAM1, CAM2, . . . , CAM20), the DB construction step being performed by the server 20 (operation S10).

The video selection signal used herein refers to a signal transmitted from the terminal 10 to the server 20 by button manipulation, screen touch manipulation, or the like of a user through an application program previously installed in the terminal 10.

The term "layer" as used herein indicates that 20 layers are obtained when photographed by 20 video photographing members, wherein each of a plurality of videos photographed by cameras forms one layer.

Meanwhile, the layer DB 30 may be constructed as follows.

That is, a distance between a subject and each of a plurality of video photographing members arranged around the subject at 360° at a constant interval is measured to align focus and axis of each video photographing member, thereby capturing a video. It is obvious that, as the number of the arranged video photographing members increases, a video of a more accurate angle may be displayed.

Figure 2:
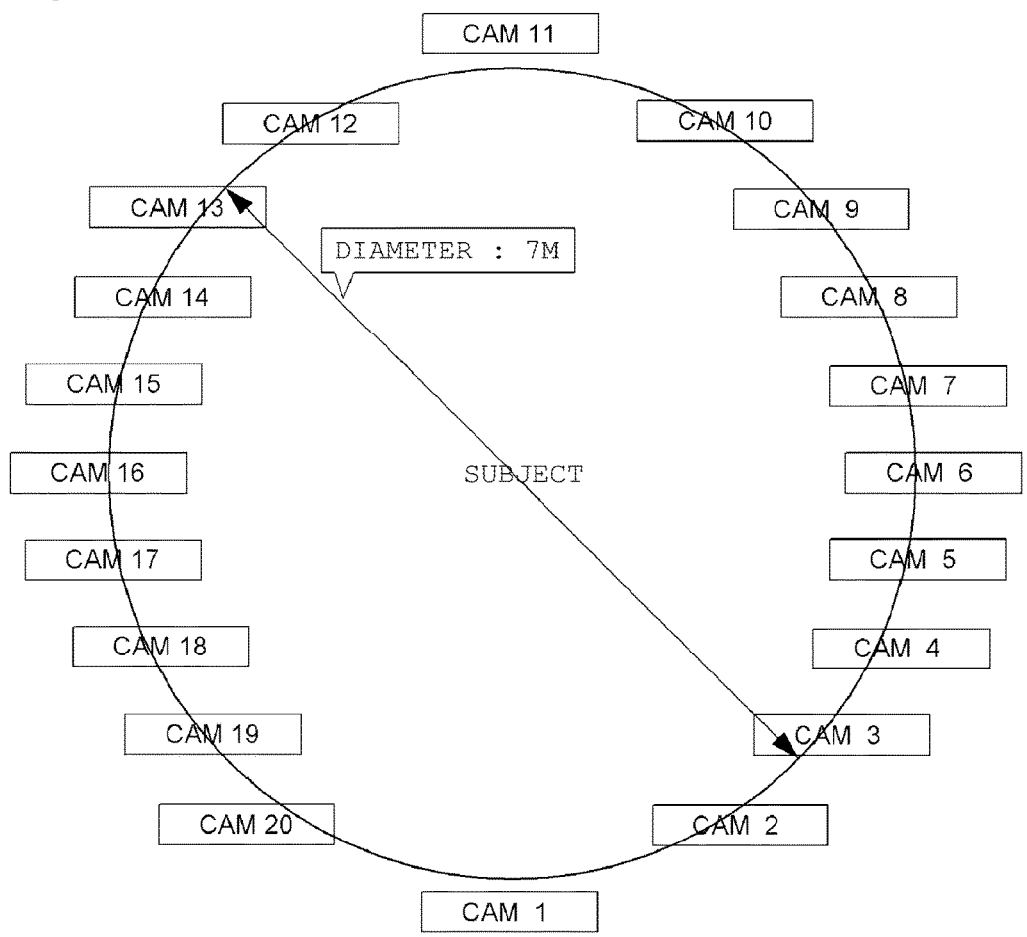
FIG. 2 is a configuration view illustrating a concept for acquiring a video by arranging 20 cameras around a subject at a constant interval.

FIG. 2 is a configuration view illustrating a concept for acquiring a video by arranging 20 cameras around a subject at a constant interval. In the present embodiment, a diameter is set to be 7 m, and the 20 cameras and the diameter of 7 m may be varied according to spatial efficiency. In addition, a camera is also preferably installed vertically above the subject (not shown).

In the captured video, video data and audio data are subjected to post-processing operations such as color matching, chroma keying, identical synchronization and editing for each video, and the like by a non-linear editing program to synchronize a video signal and an audio signal.

The non-linear editing program, which is a commercial program for uploading the captured video on a computer and editing the uploaded video, refers to a tool for processing the captured video through conversion into various codecs. Unlike a conventional linear editing program, the non-linear editing program enables editing of a desired part by freely moving forward, backward, upward, or downward from a target material.

Color matching refers to adjustment of colors by correction of color differences in images, obtained when photographed by several video photographing members in different directions, so as to eliminate color differences. The color matching is also performed using the non-linear editing program.

Chroma keying is an image synthesis method, in which photographing is performed on the front of a single background of a particular color and then the color is removed therefrom, and the resulting image is composed on a desired photograph. In this regard, green or blue is used as the background color.

The video, in which a video signal and an audio signal are synchronized with each other through the above-described post-processing operations, is constructed in the layer DB 30. Preferably, the synchronized video and audio signals are separated for each layer, the obtained image is compressed and multiplexed, and coding is performed thereon in accordance with various video reproduction requirement specifications, thereby constructing various interactive contents in the layer DB 30. The coding operation may be performed using a Unity3D image processing engine in C# programming language and Android operation system.

Next, a reproduction step, in which the server 20 transmits the video selected according to a video selection signal to the terminal 10 and the terminal 10 reproduces the selected video, is performed (operation S25). In this regard, the 360 degree spatial image reproduction method may include a transmitting step of transmitting, to the terminal 10, one or more videos adjacent to the selected video, the transmitting being performed by the server 20 (operation S20). Meanwhile, when there is no angle change signal described below, the selected video is reproduced until completion (operation S26).

Figure 3:
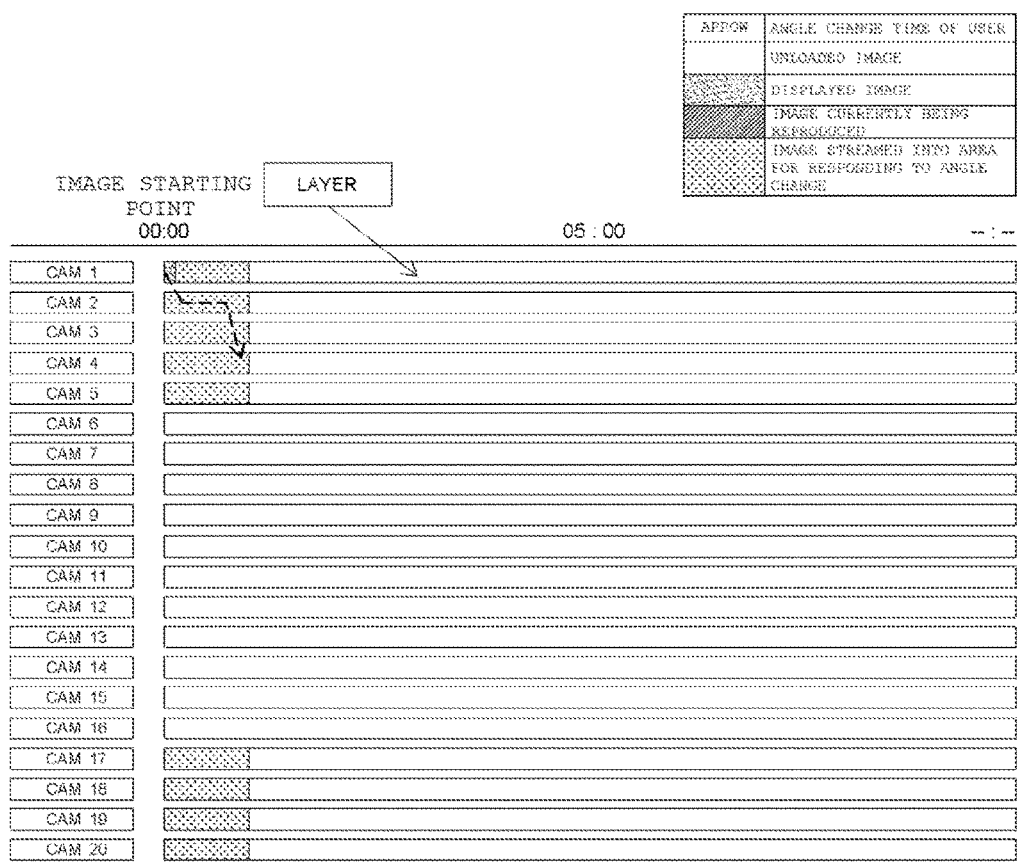
FIG. 3 is a conceptual diagram for explaining streaming loading of a video selected according to a video selection signal and a neighboring video.

FIG. 3 is a conceptual diagram for explaining streaming loading of a video selected according to a video selection signal and a neighboring video.

In FIG. 3, videos acquired by 20 video photographing members arranged around a subject are prepared. A LAYER is represented by a long horizontal bar. In the present embodiment, the length of the video is set to 10 minutes (10:00).

Referring to FIG. 3, when a video of a first camera CAM 1 is selected from the terminal 10, the server 20 transmits the corresponding video to the terminal 10, and transmits videos acquired by cameras adjacent to the first camera CAM 1 (CAM 2, CAM 3, CAM 4, CAM 5, CAM 17, CAM 18, CAM 19, and CAM 20) to the terminal 10. Thus, a total of 9 videos is transmitted. The number of videos transmitted may be freely adjusted, but the number of videos transmitted is proportional to the amount of data to be simultaneously transmitted. Consequently, the remaining 8 videos except for the video of the first camera CAM 1 are images streamed to preliminary areas for immediately responding to user's angle change requirements. Thus, the videos of sixth to sixteenth cameras CAM 6 to CAM 16 do not need to be downloaded at once from the server 20, whereby high data transmission efficiency may be achieved.

In addition, it is practically difficult to implement immediate switching of a video currently being reproduced, at an angle of 180 degrees in the opposite direction and a need therefor is low, and thus, according to the present invention, only consecutively neighboring videos are transmitted. Thus, while a user is not watching the video of the tenth camera CAM 10, the unnecessary video of the tenth camera CAM 10 and the neighboring videos do not need to be transmitted at once together with the currently reproduced video and the neighboring videos.

Next, an angle changing step of, when an angle change signal is generated from the terminal 10 according to manipulation of a user, converting the video into a video of another angle according to the angle change signal is performed (operation S30).

In addition, in the angle changing step, the transmitting step of transmitting, to the terminal 10, the video of another angle selected according to the angle change signal and one or more videos adjacent thereto (operation S20) may be performed.

Figure 4:
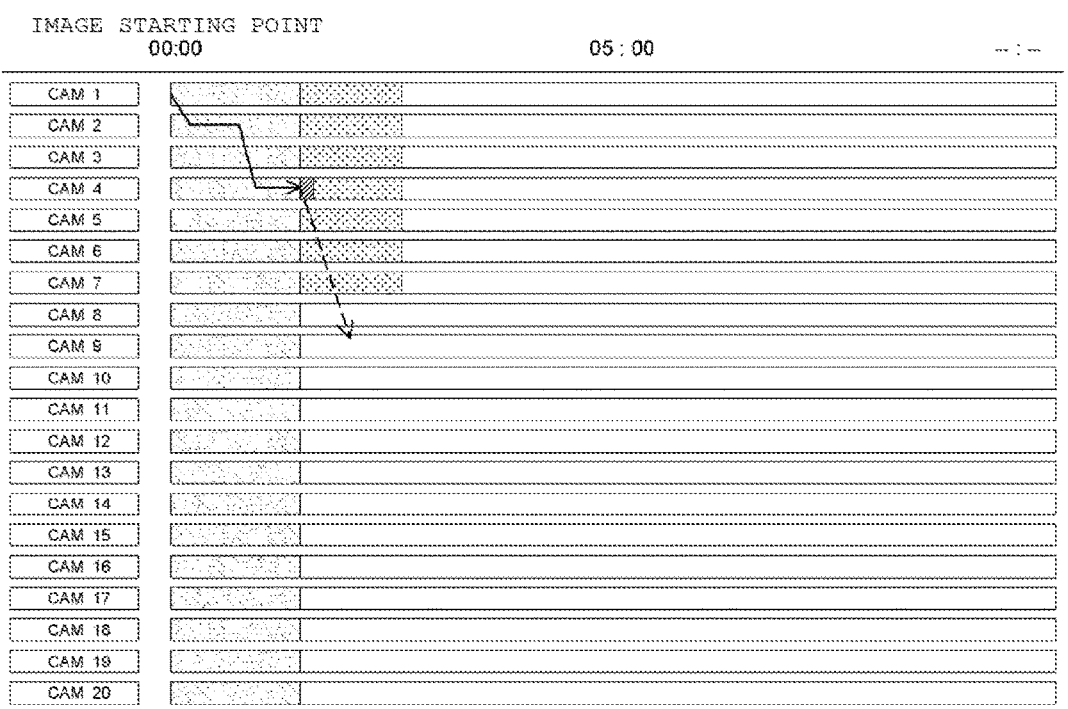
FIG. 4 is a conceptual diagram for explaining steaming loading of a video selected according to an angle change selection signal and a neighboring video.

FIG. 4 is a conceptual diagram for explaining steaming loading of a video selected according to an angle change selection signal and a neighboring video.

Similar to what was described in FIG. 3, when the server 20 receives an angle change signal from the terminal 10, the server 20 transmits the corresponding video and a neighboring video to the terminal 10. That is, an arrow illustrated in FIG. 3 denotes an angle change time through the terminal 10. Referring to FIG. 3, the video of the fourth camera CAM 4 is currently being reproduced through the video of the second camera from the first camera CAM 1 (See red color) and videos (CAM 1, CAM 2, CAM 3, CAM 5, CAM 6, and CAM 7) adjacent to the video of the fourth camera CAM 4 are being streamed (See yellow color). Meanwhile, all 20 videos are synchronized to a current reproduction time (See gray color). A dashed lined arrow denotes an angle to be changed according to user's requirements. It is obvious that, when an angle change is generated by the ninth camera CAM 9, as described above, the video of the ninth camera CAM 9 and the neighboring videos will be streamed.

Figure 5:
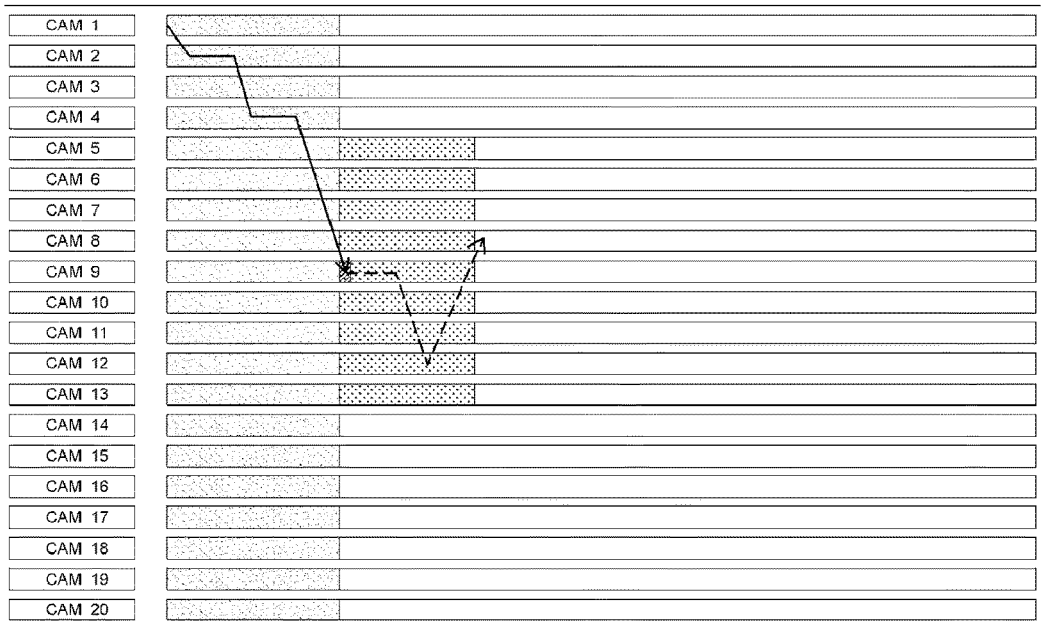
FIG. 5 is another conceptual diagram for explaining steaming loading of a video selected according to an angle change selection signal and a neighboring video.

FIG. 5 is another conceptual diagram for explaining steaming loading of a video selected according to an angle change selection signal and a neighboring video.

As in the principle described in FIG. 4, FIG. 5 illustrates that the video of the ninth camera is currently being produced according to an angle change, and the 8 neighboring videos are streamed.

Figure 6:
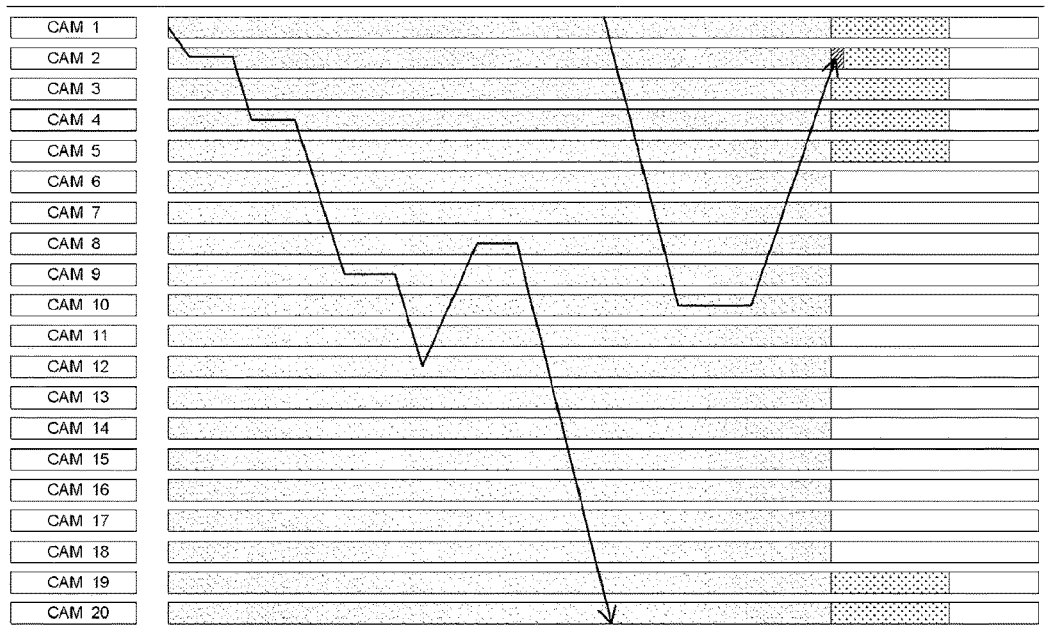
FIG. 6 is another conceptual diagram for explaining streaming loading of a video selected according to an angle change selection signal and a neighboring video.

FIG. 6 illustrates that conversion is performed from the first camera to the twentieth camera, and then to the tenth camera after moving back to the first camera, and then to the second camera and, finally, after the second camera is selected, the neighboring videos of the nineteenth camera, the twentieth camera, and the first to fifth cameras are steamed.

To achieve the technical goal of the present invention, the present invention also provides a 360 degree spatial image reproduction system.

Figure 7:
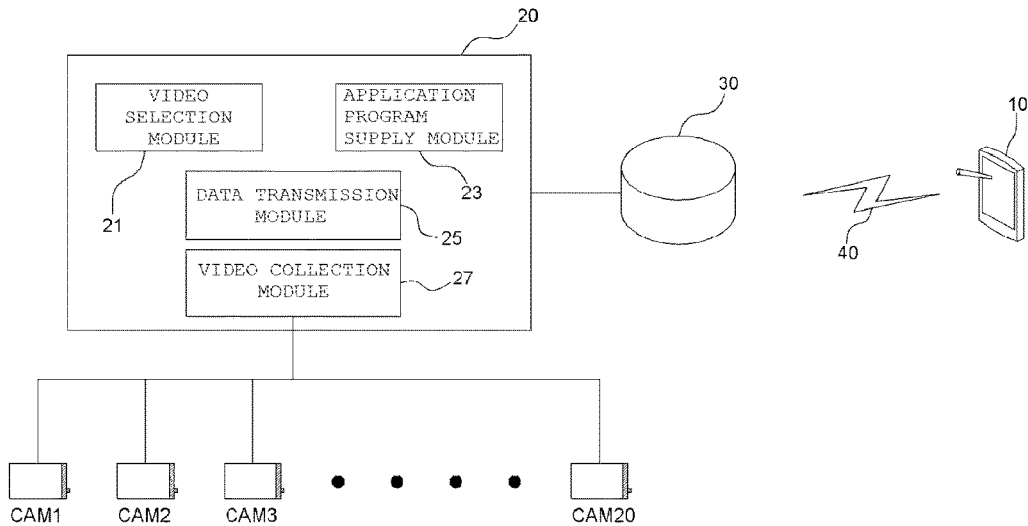
FIG. 7 is an overall configuration diagram illustrating a 360 degree spatial image reproduction system according to the present invention.

FIG. 7 is an overall configuration diagram illustrating a 360 degree spatial image reproduction system according to the present invention.

As illustrated in FIG. 7, the 360 degree spatial image reproduction system includes: the terminal 10 in which an application program for reproducing a video and selecting a video of a desired angle is installed; the server 20 to transmit and receive data through the terminal 10 and a wired/wireless network 40; and the layer DB 30 installed in the server 20 to store a video.

The terminal 10 may be a device such as a touch-type smartphone, a general PC, or the like in which an application program can be installed.

Figure 8:
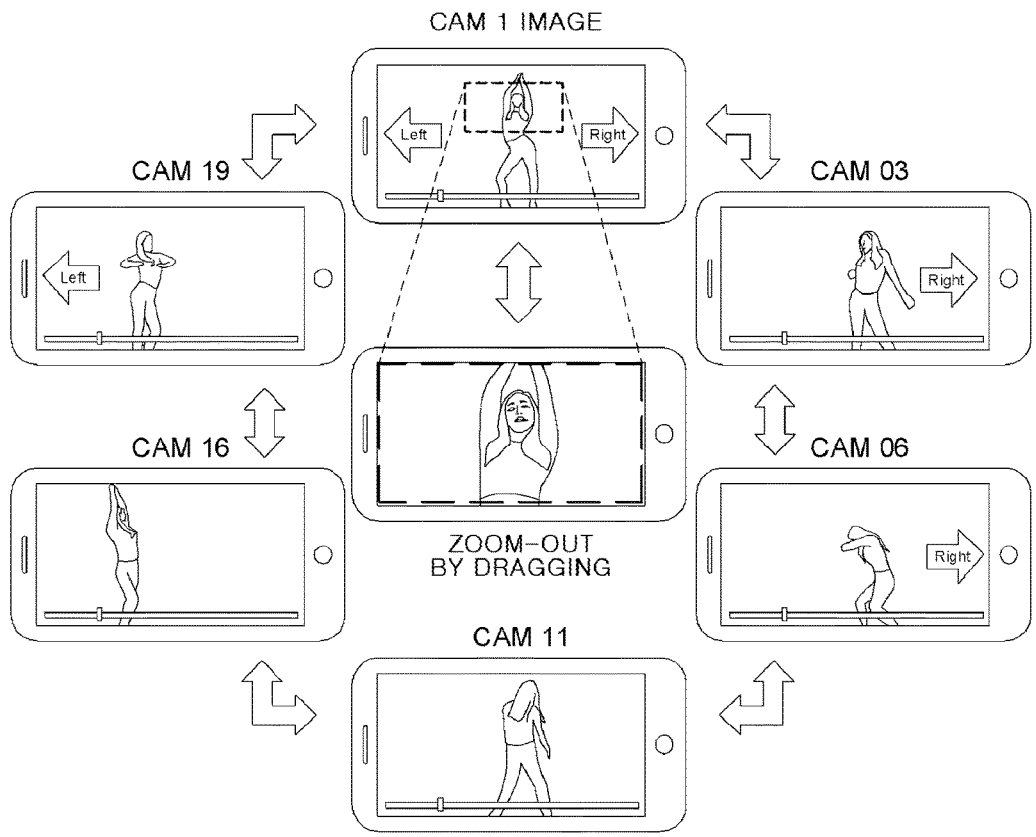
FIG. 8 illustrates a smartphone as a representative terminal that may be used in the present invention.

FIG. 8 illustrates a smartphone as a representative terminal 10 that may be used in the present invention. As illustrated in FIG. 8, when leftward or rightward movement of a video is selected, the video is converted into a video selected by the system of the present invention according to a selection signal and displayed. Furthermore, the system of the present invention may provide zoom-in and zoom-out functions of a selected specific part.

The server 20 may include: a video selection module to search for a corresponding video according to a video selection signal or angle change signal transmitted from the terminal 10, select the corresponding video and one or more neighboring videos, and transmit the videos to the terminal 10; an application program supply module 23 to supply an application program installed in the terminal 10 to reproduce a video and select a video of a desired angle; and a data transmission module 25 to transmit and receive various data to and from the terminal 10.

In addition, the server 20 may further include a video collection module 27 to collect videos photographed by a plurality of video photographing members (CAM 1, CAM 2, . . . , CAM 20) installed around a subject and store the collected videos in the layer DB 30. The video collection module 27 may have a commercial program such as a non-linear editing program to perform post-processing operations or synchronization.

Figure 9:
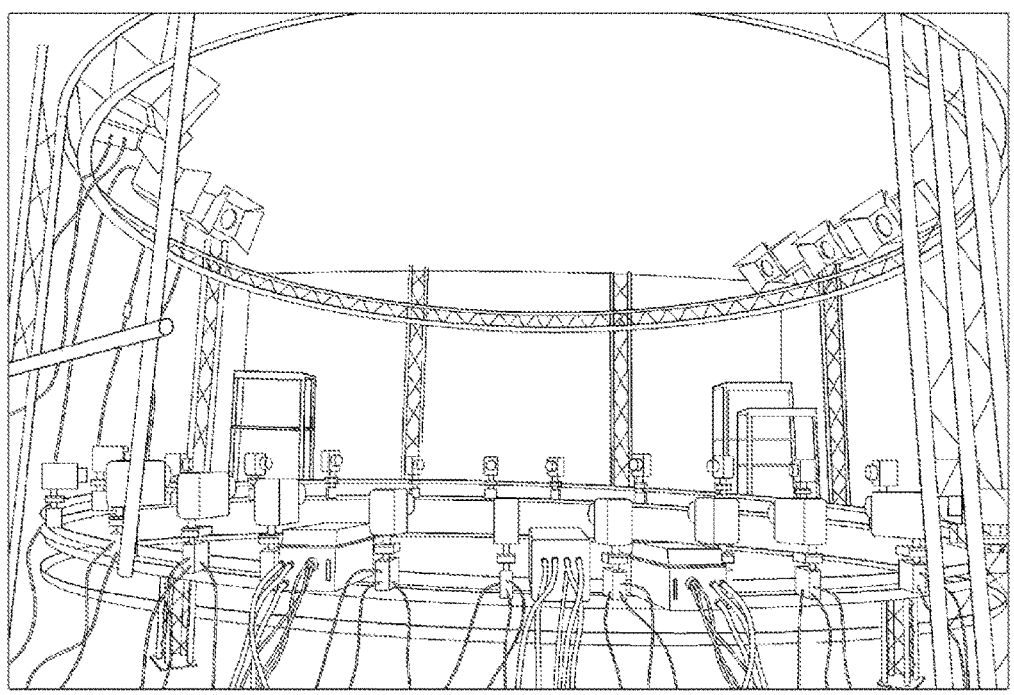
FIG. 9 is an image for actually implementing the present invention by arranging 20 video shooting members at a constant interval.

FIG. 9 is an image for actually implementing the present invention by arranging 20 video photographing members at a constant interval. In the present embodiment, a diameter is set to be 7 m and, as described above, the 20 cameras and the diameter of 7 m may be varied according to spatial efficiency.

Meanwhile, embodiments of the present invention may be implemented in the form of program instructions that can be executed through various computer components and recorded in a computer-readable recording medium. The computer-readable recording medium may include a program command data file data structure or the like alone or in combination. The program instructions recorded on the computer-readable recording medium may be those specially designed and constructed for the present invention or may be those known to those skilled in the art of computer software. Examples of a computer-readable recording medium include magneto-optical media such as magnetic media (e.g., hard disks, floppy disks, and magnetic tapes), optical recording media (e.g., CD-ROMs and DVDs), and floptical (floppy) disks, and hardware devices specifically configured to store and execute program instructions such as ROM, RAM, flash memory, and the like. Examples of program instructions include machine language code such as that generated by a compiler as well as high-level language code that can be executed by a computer using an interpreter or the like. The hardware device may be configured to operate as one or more software modules for performing processing according to the present invention, and vice versa.

As described above, various changes in design may be made within the scope of the technical goals of the present invention, but these changes are interpreted as being within the scope of the present invention unless unexpected effects are obtained due to such design changes.

The invention claimed is:

1. A method of reproducing a 360 degree spatial image, the method comprising:
   a waiting step of waiting for a video selection signal from a terminal, the waiting being performed by a server;
   a reproduction step of transmitting, to the terminal, a video selected according to the video selection signal and reproducing the selected video, the transmitting being performed by the server and the reproducing being performed by the terminal; and
   an angle change step of converting the video into a video of another angle according to an angle change signal of the terminal,
   wherein the waiting step comprises a database (DB) construction step of constructing a layer DB that stores two or more videos generated by two or more video photographing members, the DB construction step being performed by the server,
   wherein two or more videos are signals in which a video signal and an audio signal are synchronized with each other,
   wherein the synchronized video and audio signals are separated for each layer, an obtained image therefrom is compressed and multiplexed, and coding is performed thereon in accordance with various video reproduction requirement specifications,
   wherein in the reproduction step, the selected video is converted into the selected video according to a selection signal and displayed when leftward or rightward movement of the selected video is selected, and the selected video is zoomed in or zoomed out when a specific part of the selected video is selected to be zoomed in or zoomed out,
   wherein the reproduction step comprises transmitting, to the terminal, only one or more videos adjacent to the selected video, the transmitting being performed by the server, and
   wherein the angle change step comprises transmitting, to the terminal, only one or more videos adjacent to the video of another angle, the transmitting being performed by the server.

2. A system for reproducing a 360 degree spatial image, the system comprising:
   a terminal in which an application program for reproducing a video and selecting a video of a desired angle is installed;
   a server to transmit and receive data through the terminal and a wired/wireless network; and
   a layer database (DB) installed in the server to store a video,
   wherein the server further comprises a video collection module to collect videos photographed by a plurality of video photographing members installed around a subject and store the collected videos in the layer DB,
   wherein two or more videos are signals in which a video signal and an audio signal are synchronized with each other,
   wherein the synchronized video and audio signals are separated for each layer, an obtained image therefrom is compressed and multiplexed, and coding is performed thereon in accordance with various video reproduction requirement specifications, and
   wherein the selected video is converted into the selected video and displayed according to a selection signal when the terminal selects leftward or rightward movement of the selected video, and the selected video is zoomed in or zoomed out when the terminal selects to zoom in or zoom out a specific part of the selected video,
   wherein the server transmits, to the terminal, only one or more videos adjacent to the selected video, and
   wherein the server transmits, to the terminal, only one or more videos adjacent to the video of another angle.

3. The system according to claim 2, wherein the server comprises:
   a video selection module to search for a corresponding video according to a video selection signal or angle change signal transmitted from the terminal, select the corresponding video and one or more neighboring videos, and transmit the corresponding video and the one or more neighboring videos to the terminal;
   an application program supply module to supply an application program installed in the terminal to reproduce a video and select a video of a desired angle; and
   a data transmission module to transmit and receive various data to and from the terminal.

* * * * *